Nov. 10, 1936.  E. GRETENER  2,060,669
ART OF MOTION PICTURE COPYING AND PROJECTING
Filed Aug. 2, 1935
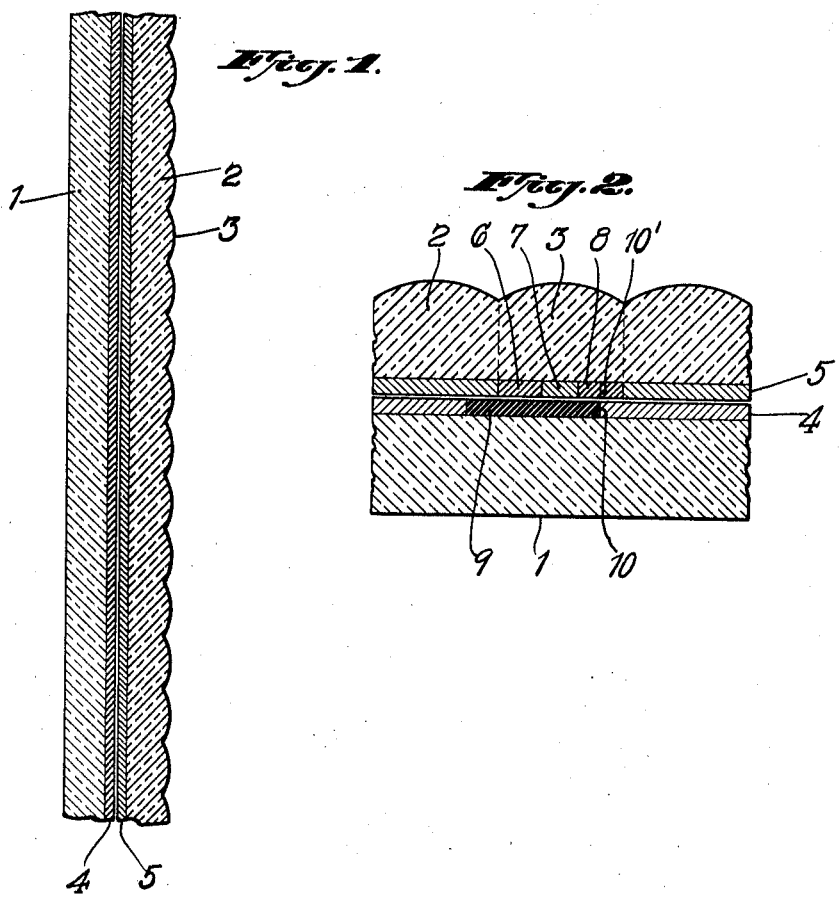

Patented Nov. 10, 1936

2,060,669

UNITED STATES PATENT OFFICE 2,060,669

ART OF MOTION PICTURE COPYING AND PROJECTING

Edgar Gretener, Berlin, Germany, assignor to Opticolor Aktiengesellschaft, Glarus, Switzerland, a corporation of Switzerland Application August 2, 1935, Serial No. 34,369
In Germany July 27, 193.

2 Claims. (Cl. 88—16.4)

This invention relates to a novel improvement in the art of motion picture copying and projecting, whereby black and white pictures may be projected onto a screen by projectors intended and equipped for the projection of lenticulated film.

The invention will be best understood from the following description and the annexed drawing, in which:

Fig. 1 is a section through two films to show their relation to each other when being copied;

Fig. 2 is a fragmentary section through a lenticulated film illustrating a feature referred to more particularly in the specification.

As is well known in the art of color photography, lenticulated films have behind each lenticulation a group of color records, and when the film is placed in a projector, that projector is equipped with a color filter having zones corresponding in number and position to the records in said group. For example, it is common to have the group of color records formed of three zones corresponding to red, green, and blue, and the color filter is likewise formed of three colored zones, namely, red, green, and blue, positioned in the same order as in the group of records on the film and behind a lenticulation of the film.

Often a film to be exhibited may comprise a length of lenticulated film with the color records thereon and a length of plain film having black and white pictures. However, the projection of the black and white pictures necessitates a change in the projector. If the filter is left on the projector, then the projection of the black and white pictures through that filter will produce on the projection screen a display of rainbow colors. This result could be avoided by stopping the projector to remove the filter and making corresponding adjustments in the illumination and possibly the other parts of the projection system, all of which changes would consume considerable time.

I avoid the above difficulties by the following method:

Instead of using black and white film of the ordinary type, I print from the black and white negative or original film 1 onto a positive or copy film 2 which has lenticulations 3 of the usual form and of the same form and characteristics as on the film used for projection of colored pictures in the same projector.

In performing the printing operation, the emulsions 4 and 5 of the two films are placed in contact with each other and pass through an ordinary contact printer, or the printing may be performed in any other suitable way. It is essential, however, that the emulsions of the two films should be disposed towards each other or at least that the copying should be done without the light passing through the lenticulations 3 so as to eliminate any effect of the lenticulations during the copying process.

The copy film 2 may be developed in the usual way and then it forms a black and white copy film which may be projected in the same projector as used with lenticulated film having color records thereon, without any change in the projector used for that purpose. For example, it is possible to splice a section of film 2 between other sections of lenticulated film having color records thereon so that the combined length of film may be run through a projector having a color filter. The result on the screen will be a projection, first, of colored pictures, then black and white pictures, and then colored pictures. This example is given solely as an instance to illustrate the possibilities of the invention.

Referring to Fig. 2, I have shown behind one of the lenticulations 3 of the film 2 a group of three areas 6, 7, and 8, corresponding in position to the usual color records. Assume that in the emulsion 4 of the film 1 appears an area 9 which represents a white object, and which therefore will appear black in the emulsion. Then when this is copied onto the film 2, the edge 10 thereof will be behind the area corresponding, for example, to the color blue. Of course, since the film 2 is printed without the use of any color filter, there will be no color records on the areas 6, 7, and 8, but when the film 2 is projected through such a filter, the lenticulations 3 will cause light passing through the area 8 to pass also through the blue zone of the filter on the projector. The result on the screen will be an extremely minute blue line at about the position corresponding to the line 10' indicated in Fig. 2.

Similar minute color lines may appear at the edge of any dark object, but are so minute that they cannot be seen on the screen at the usual viewing distance. Of course, it will be understood by those skilled in the art that such lines on the screen will be made up of a composite of a multiplicity of lines corresponding to the line 10', one line to each lenticulation. Aside from these very minute and indiscernible color lines, the pictures will be reproduced accurately upon the screen in their gray, black, or white colors, as is customary with black and white projection. The lenticulations coact with the filter to obviate the formation of color bands on the screen, except for the very minute and inconsequential lines referred to above.

While I have shown the invention as embodied in a specific form, it is to be understood that various changes in details may be made without departing from the scope of the invention, as defined by the appended claims.

I claim:

1. The method which comprises copying a picture of an object from a plain black and white original film onto a lenticulated copy film without passing the light through the lenticulations on the copy film, and projecting the same picture thus copied on said copy film onto a screen through a color filter adapted to be used with the lenticulated film when having color records thereon.

2. A film having lenticulations on one side thereof and an emulsion on the other side thereof and having black and white pictures of objects printed directly in said emulsion from the emulsion side of the film, said emulsion being free of color records.

EDGAR GRETENER.